R. A. ROBERTS.

Harvesters.

No. 136,940.  Patented March 18, 1873.

Witnesses:
John Becker
Sedgwick

Inventor:
R. A. Roberts
per
Attorneys.

UNITED STATES PATENT OFFICE.

RICHARD A. ROBERTS, OF SALISBURY, MISSOURI.

IMPROVEMENT IN HARVESTERS.

Specification forming part of Letters Patent No. 136,940, dated March 18, 1873.

*To all whom it may concern:*

Figure 1:
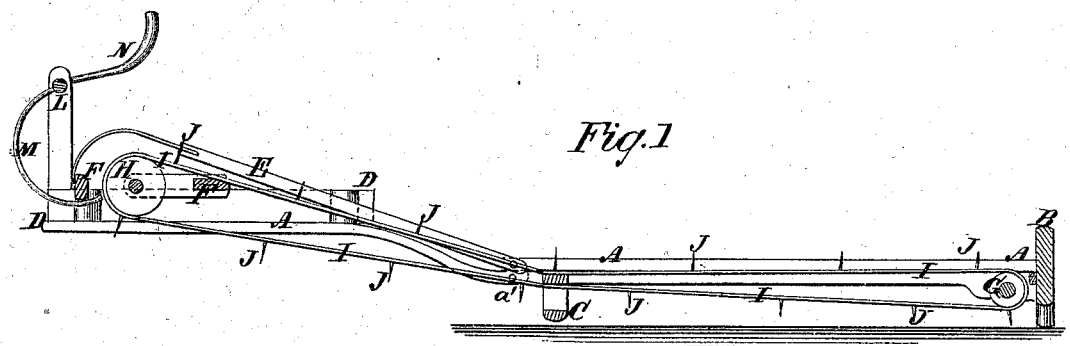
Figure 2:
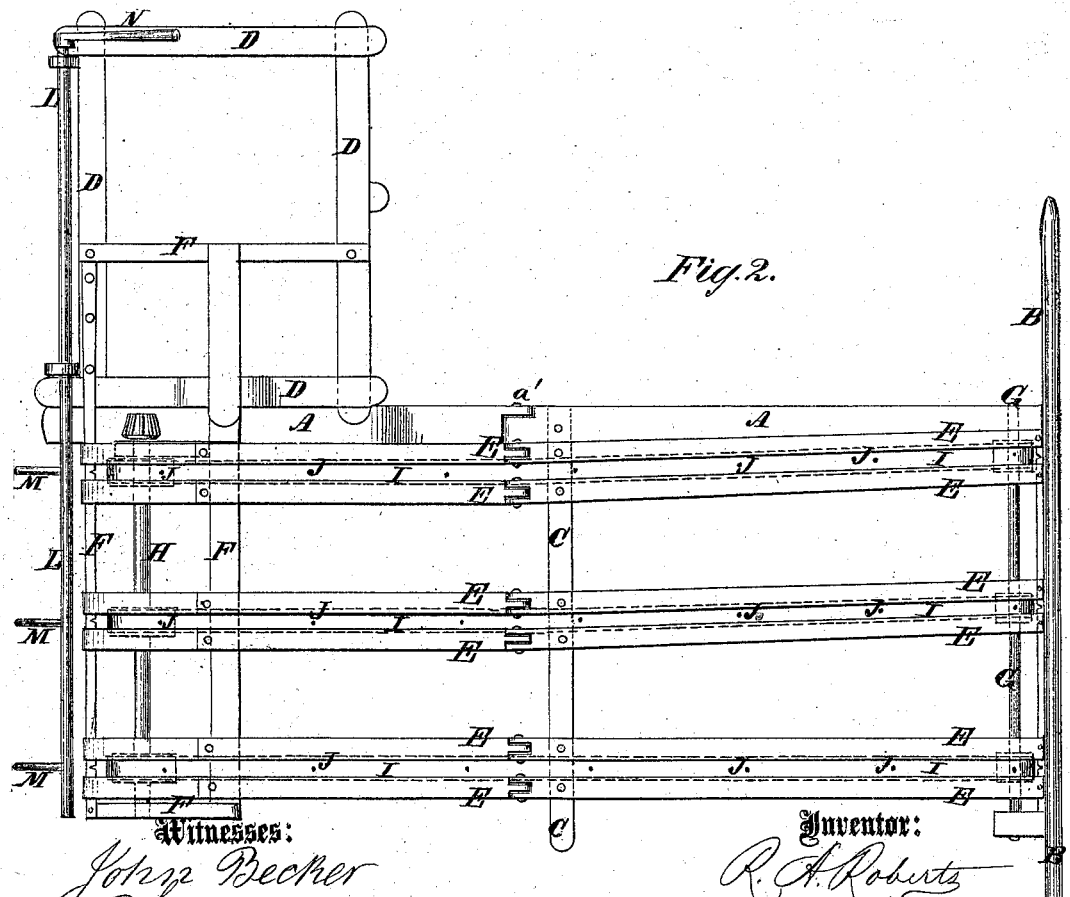

Be it known that I, RICHARD A. ROBERTS, of Salisbury, in the county of Chariton and State of Missouri, have invented a new and useful Improvement in Harvester-Droppers, of which the following is a specification:

Figure 1 is a detail sectional view of my improved dropper. Fig. 2 is a top view of the same.

My invention has for its object to improve the construction of my improved harvester-dropper for which Letters Patent No. 128,564 were granted to me July 2, 1872, so as to make it more convenient in use and more effective and reliable in operation. The invention consists in the parallel slats, jointed or hinged, and arranged in pairs, in combination with the jointed or hinged finger-bar, the grain-divider, the shoe, and the toothed belts or belt, as hereinafter fully described.

A represents the finger-bar, which is hinged or jointed at $a'$, and the outer end of which is secured to the grain-divider B. The bar A is also supported at or near its hinge or joint $a'$ by a shoe, C. The inner end of the bar A is connected with the frame D of the machine. The platform upon which the grain falls is formed of a number of pairs of parallel slats, E, the slats of each pair being placed at such a distance apart as to form a slat for the purpose hereinafter set forth. The slats E are hinged or jointed at or near the hinge or joint of the bar A. The outer ends of the slats E are secured to the grain-divider B, and their inner ends are connected with and supported by bars or a frame-work, F, attached to the frame-work D of the harvester. G is a roller, the journals of which revolve in bearings attached to the divider B. H is a similar roller, the journals of which revolve in bearings attached to the frame-work F, and to which motion is given by gear-wheels, pulleys, and belts, or other convenient means from the driving mechanism of the harvester. I are endless belts or chains, which pass around the rollers G H, and receive motion from the roller H. The belts or chains I are made wider than the slots between the slats E, so that the said slats may serve as guides to the upper parts of the said belts or chains. The lower parts of the belts or chains I pass through a wide slot in the shoe C, as shown in Fig. 1. The belts I may, if desired, be made in the form of a single wide belt. To the belt or belts I are attached teeth, prongs, or fingers, J, of such a length as to pass through the slots between the slats E, and rise above said slats sufficiently to take hold of the cut grain and carry it across the platform and up the inclined part of said platform to the dropper, which dropper is not shown in the drawing. To the upper ends of the slats E are attached curved bars K, to raise the grain from the fingers J and guide it into the dropper. L is a bar which works in bearings attached to the frame-work D F. To the bar L are attached curved arms M, which, when lowered, receive the grain and detain it while the dropper is being operated to drop the gavel to the ground.

The bar L may be operated by a lever, N, attached to its forward end. The bar L may be so connected with the dropper that they may both be operated at the same time and by the same movement.

Having thus described my invention, I claim as new and desire to secure by Letters Patent—

The parallel slats E, jointed or hinged, and arranged in pairs, in combination with the jointed or hinged finger-bar A, grain-divider B, shoe C, and toothed belt or belts I J, substantially as herein shown and described, and for the purpose set forth.

RICHARD A. ROBERTS.

Witnesses:
 EDW. P. AMMERMAN,
 LUCIUS SALISBURY.